US012505685B2

(12) United States Patent
Currier et al.

(10) Patent No.: US 12,505,685 B2
(45) Date of Patent: Dec. 23, 2025

(54) PORTABLE MACHINE LEARNING TAXA DETECTION

(71) Applicant: The Texas A&M University System, College Station, TX (US)

(72) Inventors: Robert D. Currier, Beverly Hills, FL (US); Barbara A. Kirkpatrick, Sarasota, FL (US)

(73) Assignee: The Texas A&M University System, College Station, TX (US)

( * ) Notice: Subject to any disclaimer, the term of this patent is extended or adjusted under 35 U.S.C. 154(b) by 260 days.

(21) Appl. No.: 18/170,872

(22) Filed: Feb. 17, 2023

(65) Prior Publication Data
US 2023/0260297 A1    Aug. 17, 2023

Related U.S. Application Data

(60) Provisional application No. 63/311,183, filed on Feb. 17, 2022.

(51) Int. Cl.
| | |
|---|---|
| *G06K 9/00* | (2022.01) |
| *G06V 10/70* | (2022.01) |
| *G06V 10/764* | (2022.01) |
| *G06V 10/82* | (2022.01) |
| *G06V 20/69* | (2022.01) |

(52) U.S. Cl.
CPC ......... *G06V 20/698* (2022.01); *G06V 10/764* (2022.01); *G06V 10/82* (2022.01); *G06V 10/87* (2022.01); *G06V 20/695* (2022.01)

(58) Field of Classification Search
None
See application file for complete search history.

(56) References Cited

PUBLICATIONS

Gincley, "The design of ARTiMiS: the autonomous real-time microbial scope" (Year: 2021).*
Hardison et al., "HABscope: a tool for use by citizen scientists to facilitate early warning of respiratory irritation caused by toxic blooms of Karenia brevis" (Year: 2019).*
Baek et al., "Identification and enumeration of *cyanobacteria* species using a deep neural network" (Year: 2020).*
Lakshmi et al., "Chlorella algae image analysis using artificial neural network and deep learning" (Year: 2018).*
Hardison, D. Ransom, et al. "HABscope: A tool for use by citizen scientists to facilitate early warning of respiratory irritation caused by toxic blooms of Karenia brevis." PloS one 14.6 (2019): e0218489.

* cited by examiner

*Primary Examiner* — SJ Park
(74) *Attorney, Agent, or Firm* — Thomas | Horstemeyer, LLP

(57) ABSTRACT

Portable imaging and taxa classification systems and methods are described. One such method comprises accessing at least one microscopic image captured using an imaging device and a microscope from memory and executing a machine learning (ML) routine on the at least one computing device using a single image frame of the at least one microscopic image as an input to identify a presence of a taxa.

20 Claims, 12 Drawing Sheets

```
"taxa" : {
    "karenia" : {
        "train_dir" : "/data/pt4/taxa/karenia/training/",
        "validation_dir" : "/data/pt4/taxa/karenia/validation/",
        "calibration_dir" : "/data/pt4/taxa/karenia/calibration",
        "weights_file" : "configs/weights/karenia_weights.h5",
        "model_file" : "configs/models/karenia_model.json",
        "scale_file" : "configs/scales/karenia_live_scale.json",
        "live_scale_file" : "configs/scales/karenia_live_scale.json",
        "fixed_scale_file" : "configs/scales/karenia_fixed_scale.json",
        "noiseSigma" : 0.3,
        "learning_rate" : 0.005,
        "rect_color" : "0,255,255",
        "rect_thick" : 1,
        "max_cons" : 100,
        "con_area_min" : 25,
        "con_area_max" : 50,
        "con_arc_min" : 5,
        "con_arc_max" : 500,
        "con_color_true" : "255,255,255",
        "con_color_false" : "0,0,0",
        "edges_min" : 35,
        "edges_max" : 75,
        "flatten" : 1000,
        "MOG_history" : 50,
        "MOG_thresh" : 10,
        "radius_min" : 5,
        "radius_max": 10,
        "thresh_min" : 50,
        "thresh_max" : 255,
        "max_thumbs" : 5000,
        "min_fill" : 5000,
        "morph_min" : 3,
        "morph_max" : 3,
        "iterations" : 3,
        "skip_frames" : 16,
        "fps" : 16,
        "roi_min" : 10,
        "roi_max" : 500,
        "max_cells_cutoff" : 199,
        "frame_delay" : 0,
        "x_offset" : 50,
        "y_offset" : 50,
        "roi_offset" : 50,
        "frame_delay" : 0.025,
        "poi" : {
            "width" : 20,
            "height" : 20,
            "corner_thick" : 1,
            "line_thick" : 1,
            "dash_length" : 6,
            "rect_color" : "0,200,50"
        }
    },
    "pyrodinium" : {
        "train_dir" : "/data/hsp/taxa/pyrodinium/training/",
        "validation_dir" : "/data/hsp/taxa/pyrodinium/validation",
```

FIG. 4

PORTABLE MACHINE LEARNING TAXA DETECTION

CROSS-REFERENCE TO RELATED APPLICATION

This application claims priority to U.S. provisional application entitled, "Portable Machine Learning Taxa Detection," having Ser. No. 63/311,183, filed Feb. 17, 2022, which is entirely incorporated herein by reference.

STATEMENT REGARDING FEDERALLY SPONSORED RESEARCH OR DEVELOPMENT

This invention was made with government support under grant numbers NA20NOS4780194 awarded by the National Oceanic and Atmospheric Administration, NA16NOS0120018 awarded by the National Oceanic and Atmospheric Administration, and NNH15AB231 awarded by the National Aeronautics and Space Administration, Research Opportunities in Space and Earth Sciences. The government has certain rights in the invention.

BACKGROUND

Today, to confirm the presence of *Karenia brevis* (*K. brevis*) and other taxa (e.g., microalga), samples are collected from a water source and the samples are physically transported to a laboratory for analysis. At the laboratory, a trained taxonomist views the samples via a microscope, performs a count of the number of organisms detected in the sample (often with a handheld counter), and microalga is identified based on the count. This method of detection is extremely labor-intensive and time consuming while requiring a trained taxonomist. Notably, brevetoxins produced during *Karenia* blooms can cause neurotoxic shellfish poisoning in humans, massive fish kills, and the death of marine mammals and birds. Brevetoxin-containing aerosols are an additional problem, having a severe impact on beachgoers, triggering coughing, eye and throat irritation in healthy individuals, and more serious respiratory distress in those with asthma or other breathing disorders. As such, delayed testing can cause health problems to marine environments and communities of people.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 4 is an example data structure showing taxa-specific detecting settings according to various embodiments of the present disclosure.

DETAILED DESCRIPTION

Figure 1A:
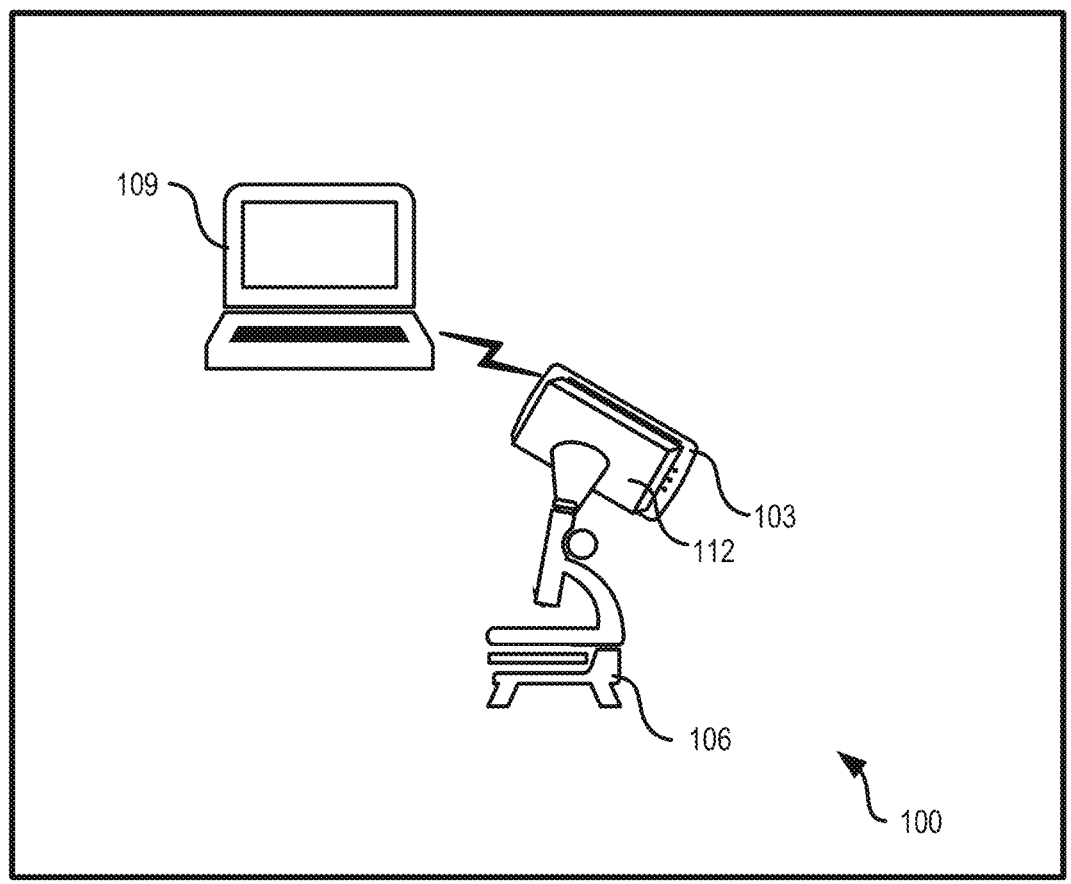
FIG. 1A is a line drawing of a portable imaging and taxa classification system for identifying various taxa according to various embodiments of the present disclosure.

Portable machine learning taxa detection is described according to various embodiments. In some embodiments, a portable imaging and taxa classification system includes an imaging device, a microscope, and at least one computing device (referred to herein as a computing device in the singular for explanatory purposes). In various embodiments, the portable imaging and taxa classification system further includes an attachment device comprising a housing sized and shaped to secure the imaging device to the microscope, where the at least one computing device is disposed within the housing.

The computing device may be configured, through execution of suitable program instructions, to access at least one microscopic image captured using an imaging device and a microscope from the memory, where the at least one microscopic image has a resolution greater than 640 pixels by 480 pixels. The computing device may execute a machine learning (ML) routine thereon using the at least one microscopic image as an input to identify a presence of a taxa. The machine learning routine may be selected from a group consisting of a neural network classifier; a convolutional neural network classifier (CNN); a regions with convolutional neural network features (R-CNN) classifier; a deep learning classifier, among others. The computing device may, in some embodiments, display information associated with the presence of the taxa in a display device communicatively coupled to the computing device.

While some prior systems exist for detecting taxa using a machine learning routine and a microscope, video files were captured and sent remotely to a server for remote analysis. Additionally, detection routines relied on detecting motion of items within frames of a video file. As such, these detection routines often took seven to ten minutes to perform a classification of a taxa. However, according to the embodiments described herein, a classification may be performed locally or remotely, where the classification does not rely on motion detection, speeding up detection of taxa down to about four seconds (from about seven to ten minutes) and using less bandwidth, networking, and computing resources (e.g., utilizing less central processing unit (CPU) resources and utilizing less memory).

Additionally, as compared to prior systems, a high-resolution camera is employed producing microscopic images having greater than 640 pixel by 480 pixel resolution; providing highly-configurable camera options; providing customizable optical staining algorithms; generating a customized user interface; making real-time analysis available; performing local on-board classification as well as remote classification in a remote computing environment (e.g., a cloud computing environment); and pre-processing microscopic images using taxa-specific settings (as opposed to analyzing moving objects which is computationally expensive).

In the following discussion, a general description of the portable imaging and taxa classification system and its components is provided, followed by a discussion of the operation of the same.

Figure 1B:
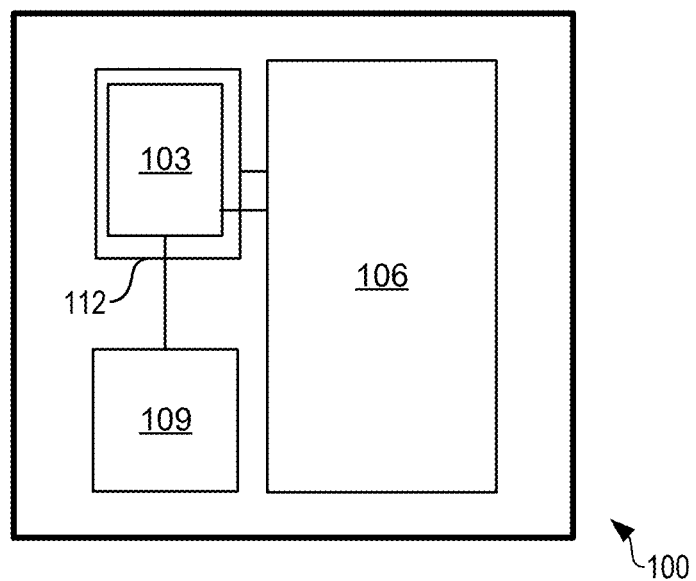
FIGS. 1B and 2 are block diagrams of a portable imaging and taxa classification system for identifying various taxa according to various embodiments of the present disclosure.
Figure 2:
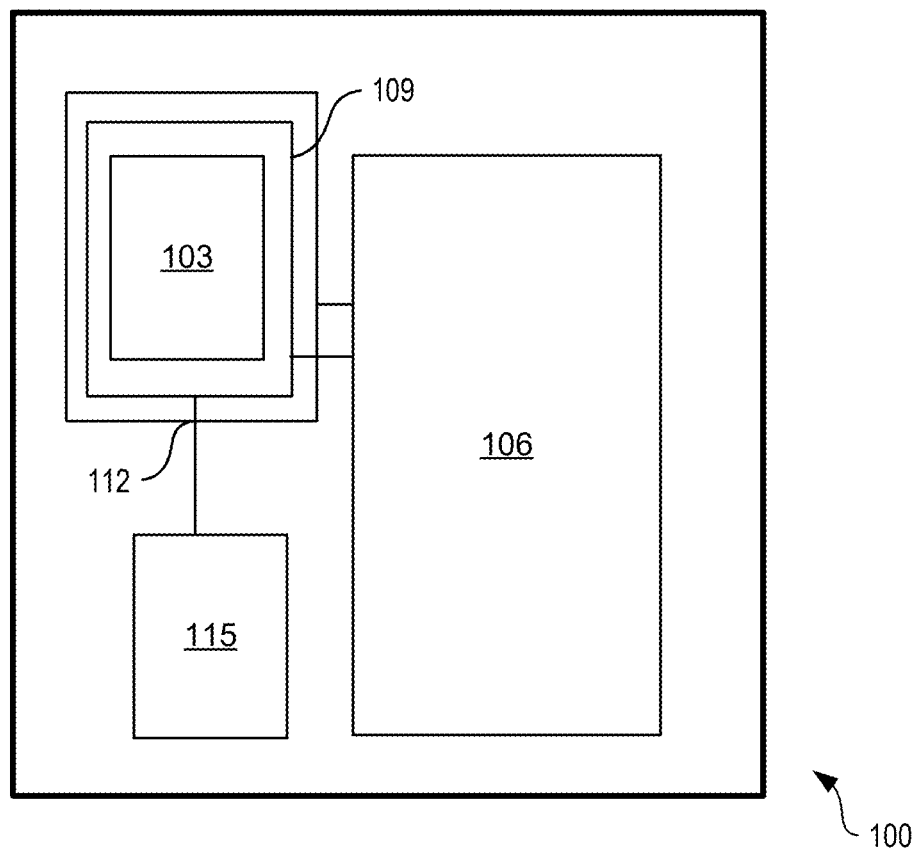

With reference to FIGS. 1A, 1B, and 2, various embodiments of a portable imaging and taxa classification system 100 are shown. The portable imaging and taxa classification system 100 may include an imaging device 103, a microscope 106, and at least one computing device 109 (referred to herein as a computing device 109 in the singular for explanatory purposes). In various embodiments, the portable imaging and taxa classification system 100 further includes an attachment device 112 comprising a housing sized and shaped to secure the imaging device 103 to the microscope 106. While shown as being external to the housing of the attachment device 112 in FIG. 1B, the computing device 109 may be disposed within the housing of the attachment device 112, as shown in FIG. 2.

The imaging device 103 may include a camera of a smartphone, a mobile or portable telephone, a tablet computing device, or other similar electronic device. While the imaging device 103 is shown separate from the microscope 106, in some embodiments, the imaging device 103 may be a built-in microscope 106, as may be appreciated. In embodiments in which the imaging device 103 is separate from the microscope 106, the attachment device 112 may align the camera of the electronic device with an ocular lens (or eye piece) of the microscope 106, thereby capturing one or more images (e.g., video or still images) of a sample put on a slide of the microscope 106. The imaging device 103 may communicate the one or more images (e.g., a video file or image file(s)) via a wired or wireless connection to the computing device 109, where the computing device 109 may store the one or more images in memory of the computing device 109. The computing device 109 may have program instructions stored in memory of the computing device 109 that, when executed by at least one hardware processor, direct the computing device 109 to identify taxa in the sample (e.g., taxa from a water sample).

The computing device 109 may further cause information associated with the taxa (e.g., the name of the taxa and other information associated therewith) to be displayed or output on a display device 115. While an external type of the display device 115 is shown in FIG. 2, a display device 115 of the electronic device (e.g., the smartphone or tablet) may be employed in some embodiments. As the portable imaging and taxa classification system 100 is portable, it may be used to classify taxa at a site where a sample is collected, saving days or even weeks required by traditional laboratory tests.

In some embodiments, the computing device 109 may be in data communication with a computing environment (e.g., a server) via a network. The network includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment may include, for example, a server computer or any other system providing computing capability. Alternatively, the computing environment may employ a plurality of computing devices that may be arranged, for example, in one or more server banks or computer banks or other arrangements. Such computing devices may be located in a single installation or may be distributed among many different geographical locations. For example, the computing environment may include a plurality of computing devices that together may comprise a hosted computing resource, a grid computing resource, and/or any other distributed computing arrangement.

The computing device 109 may be representative of one or more computing devices 109 that may be coupled to the portable imaging and taxa classification system 100. The computing device 109 may include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The computing device 109 may include a display. The display may include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The computing device 109 may be configured to execute various applications such as a client application and/or other applications. The client application may be executed in a computing device 109, for example, to access network content served up by the computing environment and/or other servers, thereby rendering a user interface on the display device 115. To this end, the client application may comprise, for example, a browser, a dedicated application, etc., and the user interface may comprise a network page, an application screen, etc. The computing device 109 may be configured to execute applications beyond the client application such as, for example, an operating system, email applications, social networking applications, word processors, spreadsheets, and/or other applications.

Figure 3:
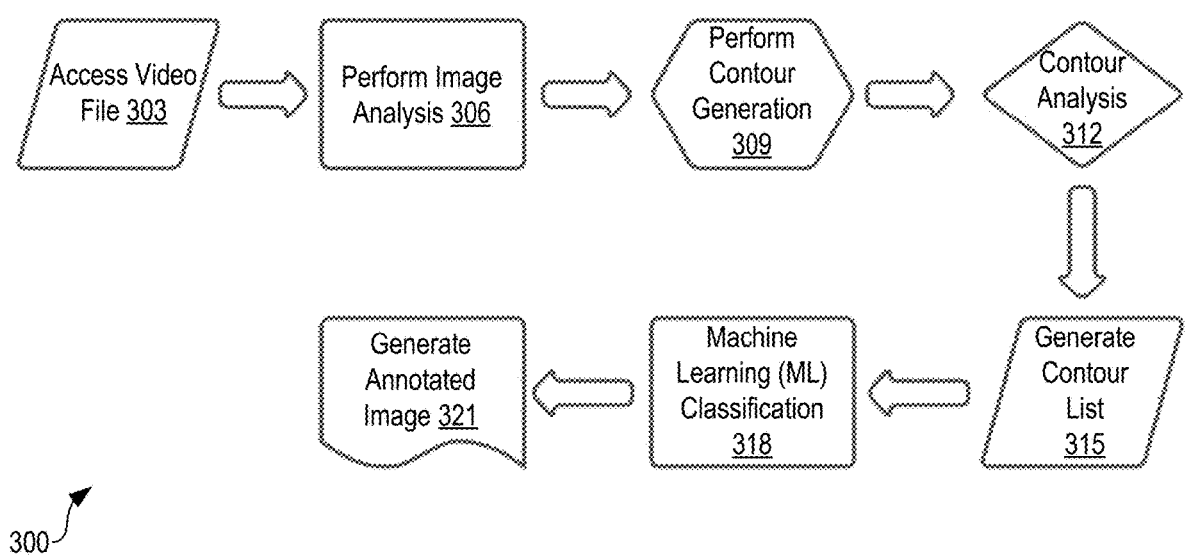
FIG. 3 is a flowchart illustrating one example of functionality implemented as portions of a taxa detection algorithm executed in a computing device in the portable imaging and taxa classification system of FIGS. 1A, 1B, and 2 according to various embodiments of the present disclosure.

Referring next to FIG. 3, shown is a flowchart 300 that provides one example of the operation of a portion of the computing device 109 according to various embodiments. It is understood that the flowchart 300 of FIG. 3 provides merely an example of the many different types of functional arrangements that may be employed to implement taxa identification and classification as described herein. As an alternative, the flowchart 300 of FIG. 3 may be viewed as depicting an example of elements of a method implemented in the computing device 109 according to one or more embodiments.

First, at box 303, the computing device 109 may access a video file, for instance, from memory of the computing device 109. The video file may include one generated by the imaging device 103 and the microscope 106 which may be communicated to the computing device 109 (e.g., via a wired or wireless connection) and stored in memory of the computing device 109.

Next, at box 306, the computing device 109, for each frame of the video file, the computing device 109 may generate a count of a number of areas of interest in a respective frame of the video file using taxa-specific settings. The video file may include an MP4 file, MPEG file, AVI file, MOV file, or other suitable format as may be appreciated. Various examples of taxa-specific settings can include, for example, those shown in the data structure of FIG. 4, where the settings are optimized for *Karenia brevis*. In some embodiments, OpenCV™ or other image libraries may be employed to analyze frames of the video files.

At box 309, the computing device 109 may perform contour generation and, at box 312, the computing device 109 may perform contour analysis. Thereafter, at box 315, the computing device 109 may generate a contour list, which may include a data structure of identified contours and data associated therewith. The machine learning routine may include one or more of a neural network classifier; a convolutional neural network classifier (CNN); a regions with convolutional neural network features (R-CNN) classifier; and a deep learning classifier. In some embodiments, the machine learning routine is trained using a library of manually-curated and manually-classified taxa images.

The computing device 109 may then identify at least one microscopic image of the frames of the video file having a threshold number of areas of interest or the at least one microscopic image of the frames of the video file having a highest count of the number of the areas of interest. The at least one microscopic image may have a resolution greater than 640 pixels by 480 pixels.

Figure 5:
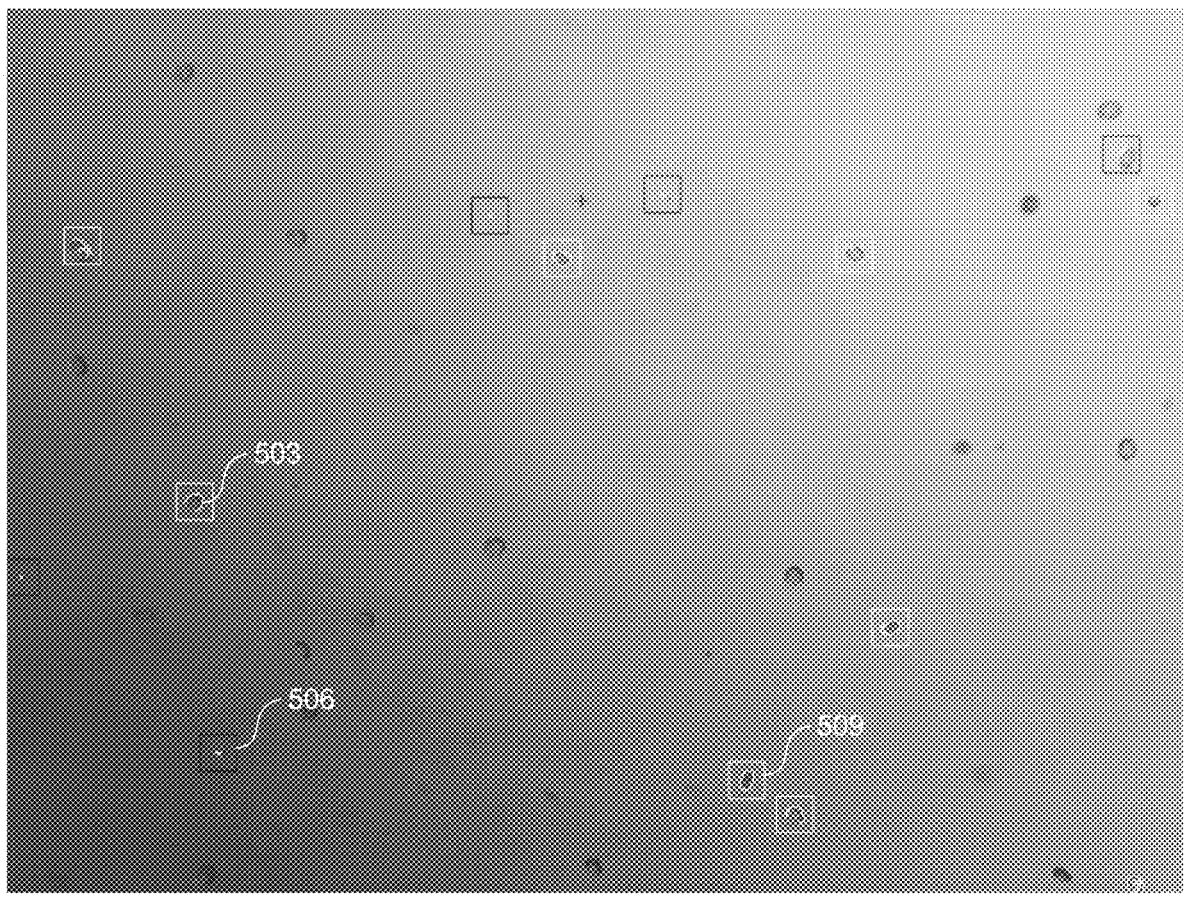
FIG. 5 is an example output of a machine learning routine showing detected taxa in a microscopic image according to various embodiments of the present disclosure.

At box 318, at least one microscopic image may be used as an input of a machine learning (ML) classification routine where the classification routine identifies the presence of taxa using machine learning and generates an annotated image, at box 321. An example of an annotated image is shown in FIG. 5, where a detected contour 503 (shown as white lines surrounding contour), a detected area of interest 506 not classified as taxa (shown in black boxes), and detected taxa 509 (shown in white boxes). The detected taxa 509 may include *K. brevis* as well as other taxa as may be appreciated.

In some embodiments, the portable imaging and taxa classification system 100 may quantify *K. brevis* and/or other taxa cell abundance using a machine learning model (e.g., CNN, R-CNN, and so forth), which may include deep learning computer programs used for analyzing and identifying visual imagery. In the past, cell identification criteria was based on detecting swimming motion of *Karenia* cells among multiple frames, with stationary objects ignored. Currently, high resolution imagery allows for classification using a single image frame, conserving valuable computing resources and increasing the overall efficiency of the portable imaging and taxa classification system 100.

In various embodiments, the machine learning routine used in the portable imaging and taxa classification system 100 may comprise, for example, an input layer, three convolutional layers, a fully connected layer, and an output layer. The activation function for all layers except the output layer is a rectified linear unit (ReLU). A sigmoid activation function may be used for the output layer due to this being a binary cross-entropy model. The output layer may be configured as Dense(1) as is appropriate for a binary classification problem. TensorFlow, an open-source library to develop and train machine learning models, may be employed to construct the machine learning routine. In some embodiments, teaching the machine learning routine to perform accurate image recognition (e.g., to identify *K. brevis*) may be an iterative process.

For instance, laboratory cultures of *K. brevis* may be employed to train the machine learning routine to perform feature recognition. Further, in some embodiments, the machine learning routine may be trained to better distinguish *K. brevis* from other similar sized, free-swimming dinoflagellates and taxa. In various experiments, approximately 5,993 images of *K. brevis, Amphidinium* sp., and *Alexandrium catenella* were acquired to allow a CNN to train in order to recognize morphological differences between *K. brevis* and other taxa. As the CNN is configured as a binary cross-entropy model using rmsprop as an optimizer, the trained network classified cells into one of two classes: '*K. brevis*' or 'not *K. brevis*.' However, it is understood that multiple classifications of taxa may be performed simultaneously or iteratively.

The images classified as not *K. brevis* may be indicated by a suitable marker (e.g., a red target box marker). Some machine learning routines (e.g., convolutional neural networks) do not have the ability to 'know if it is right or wrong.' Rather, the machine learning routine simply reports the likelihood that the image in question has a higher or lower probability of matching one of two categories upon which it has been trained. In various embodiments, a Keras Python library may be employed to encode the 0.0 to 1.0 (e.g., 0.1, 0.2, and so forth) answer returned by the machine learning routine into a definite 1 (identified) or 0 (not identified), using a suitable threshold (e.g., 0.5). If the machine learning routine reports a 0.6, the Keras library may return a 1. If the machine learning routine outputs a 0.4, the Keras library may return a 0. The ability of the discriminatory function to correctly classify *K. brevis*, and to classify *Amphidinium* sp. and *Alexandrium catenella* as not *K. brevis* was confirmed using mixed cultures of the three species where the relative proportion of *K. brevis* to the other species was known. *K. brevis* cells were spiked into the natural water samples in order to test the ability of the system to discriminate *K. brevis* cells from other material.

An image analysis pipeline may be generated to estimate cell concentrations. Short, 30 second videos were taken of laboratory cultures containing varying, but known, concentrations of *K. brevis* using the portable imaging and taxa classification system 100. In total, thirty-five videos were analyzed. Cell concentrations in each *K. brevis* culture was determined using a Beckman Coulter Multisizer 3 particle counter. A 280 μm aperture tube and 1 mL sample volume were utilized for particle counts. Concentrations ranged from 50,000 cells L−1 to 30,000,000 cells L−1.

When a region of interest was identified, it was compared to a list of known morphological characteristics of the model taxa. If the region of interest (ROI) was determined to match the model taxa, the ROI was clipped from the video frame and fed to the deep learning model. The deep learning model was built using Python language (https://www.python.org), TensorFlow open source numerical computation library, and the Keras high-level neural network application programming interface (API). The output was a "self-learned" scale of visible cells ranging from zero to two hundred cells. By comparing the "self-learned" cell counts for each culture with the corresponding known cell counts, it was possible to develop a scale for translating the processed videos of the portable imaging and taxa classification system 100 into actual cell counts over the range of zero to thirty million cells L−1.

The portable imaging and taxa classification system 100 was tested by having scientists sample an ongoing bloom at Mote Marine Lab's New Pass (27° 20'01.67" N, 82° 34'44.60" W) and Bay (27° 19'53.89" N, 82° 34'39.67" W) docks. Special permission from Mote Marine Laboratory was granted to take water samples at these dock locations. Surface seawater samples were collected in 20 mL vials. Immediately after the water samples were collected, the capped vials were gently mixed by slow inversion several times to ensure cells were in suspension and three drops were added to a 100 µL depression slide with a dropper pipette and examined with the microscope. Autoexposure of the imaging device 103 was locked and the imaging device 103 was adjusted to full zoom. Once cells were focused on the microscope at 40×, a 30 second video was taken and uploaded via hotspot to a web site. The video was automatically analyzed using the neural network software (remotely in this instance) and a cell estimate was produced. Along with uploaded videos, the portable imaging and taxa classification system 100 also recorded latitude, longitude, and local time from a global positioning system (GPS) receiver of the electronic device.

To determine the accuracy of the count made by the portable imaging and taxa classification system 100, the remainder of each sample was preserved using several drops of neutral iodine solution. The preserved cells were transported to the laboratory and stored at 4° C. until they were counted manually. For manual counting, each vial was mixed by inverting the vial several times and gently transferring the entire sample to a single well in a 6-well Falcon polystyrene tissue culture plate. Cells were allowed to settle for several hours, and then counted using an inverted microscope. The bottom of the plate was systematically scanned, and the cells were tallied on a hand counter. If four-hundred cells were reached, the ratio of the surface area counted to total well surface area was used to estimate the total cell concentration. The manually counted samples were then compared to the counts for corresponding samples estimated using the portable imaging and taxa classification system 100.

With respect to evaluating performance of the portable imaging and taxa classification system 100, it is desirable for the portable imaging and taxa classification system 100 to accurately estimate $K.$ $brevis$ abundance to produce an acceptable respiratory risk assessment. Previous work demonstrated that cell concentrations below 100,000 cells $L^{-1}$ pose low respiratory risks, whereas $K.$ $brevis$ concentrations between 100,000 cells $L^{-1}$ to 1,000,000 cells $L^{-1}$ and above 1,000,000 cells $L^{-1}$ pose medium and high risks, respectively. Therefore, the portable imaging and taxa classification system 100 is equipped to determine if $K.$ $brevis$ abundance at a given location (e.g., a beach) is less than 100,000 cells $L^{-1}$ (low-risk), between 100,000 cells $L^{-1}$ and 1,000,000 cells $L^{-1}$ (medium-risk), or greater than 1,000,000 cells $L^{-1}$ (high-risk) in order to provide data sufficient for a respiratory forecast. For low, medium, and high concentrations of $K.$ $brevis$ cells, there was an empirical relationship between wind speed and direction (relative to the prevailing shoreline orientation) and the degree of respiratory risk from aerosolized brevetoxins. As a result, high resolution wind speed and direction data, combined with estimated $K.$ $brevis$ abundance data, could provide forecasting capacity sufficient to gauge respiratory risk on individual locations, such as beaches. Considering the availability of National Weather Service (NWS) high resolution (<2.5 km) wind speed and direction data, respiratory risk assessments based on local wind conditions may be provided at three-hour intervals for up to twenty-four hours after $K.$ $brevis$ cell counts are determined.

The portable imaging and taxa classification system 100 was assessed for bias and accuracy. Given the range of data, both were determined as percentages, accuracy was determined as mean absolute percentage error (MAPE) and bias as mean percentage error. Over several orders of magnitude, MAPE is typically a better accuracy metric than mean absolute error, as error tends to be proportional to the magnitude. The current model for respiratory irritation is categorized as "low, medium, or high," corresponding to the equivalent cell concentrations. The ability of the portable imaging and taxa classification system 100 field retrievals was accordingly assessed as a classification confusion matrix (assesses performance of the classification algorithm), and percent accuracy for the three classes was determined. The Kappa statistic, which compares how well the classifier performed as compared to how it would have performed by chance, was calculated. Kappa=0 indicates the classification performs no better than random matches between the two classes, a Kappa=1 indicates an exact match.

Figure 6:
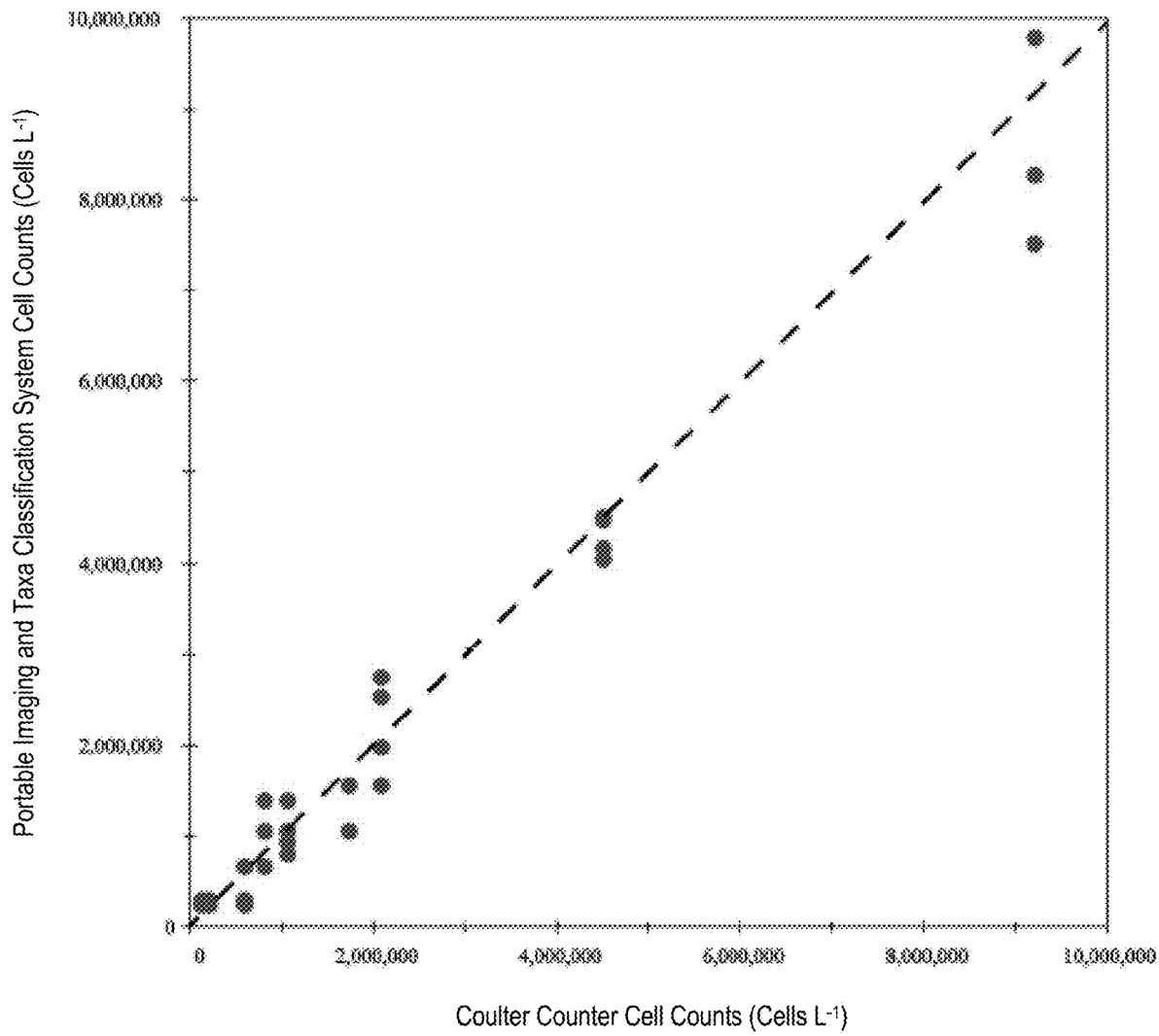
FIG. 6 is a chart showing a laboratory validation of cell counts measured by the portable imaging and taxa classification system compared to Coulter Counter cell counts according to various embodiments of the present disclosure.

A comparison between the cell abundances determined using the portable imaging and taxa classification system 100 recognition software (cells $L^{-1}$) with those determined with the particle counter (cells $L^{-1}$) showed that the software was able to detect $K.$ $brevis$ cells with an accuracy (MAPE) of 31% over a range of 120,000 to 9,200,000 cells $L^{-1}$, as shown in FIG. 6. This approximately spans the range of low, medium, and high cell concentrations needed to assess respiratory risk. In comparison to cell concentrations determined with a Coulter Counter, the portable imaging and taxa classification system 100 showed a linear response over this entire range but tended to over-estimate the lowest concentrations. There was no evident bias at other cell concentrations.

The limit of detection for the portable imaging and taxa classification system 100 was determined using the number of cells visible in the field-of-view (FOV). At a magnification of 40× and a cell concentration of 50,000 $K.$ $brevis$ cells $L^{-1}$, one to two cells are visible within the FOV. This means that the lower limit of detection for the portable imaging and taxa classification system 100 is 50,000 $K.$ $brevis$ cells $L^{-1}$. As cell concentration increases so does the number of cells in the FOV.

Figure 7:
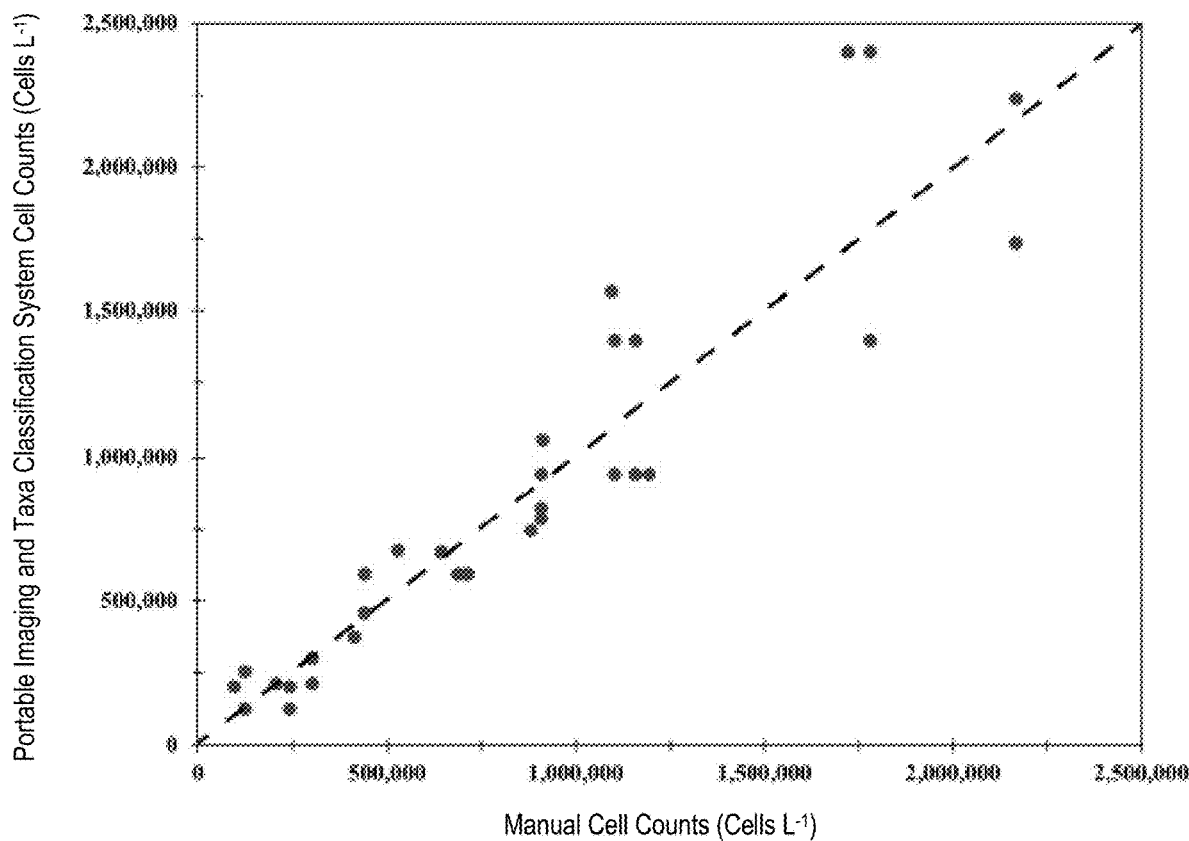
FIG. 7 is a chart showing a field validation of cell counts measured by the portable imaging and taxa classification system compared to manual cell counts according to various embodiments of the present disclosure.

An analysis of the portable imaging and taxa classification system 100 $K.$ $brevis$ cell abundance data from field samples versus cell concentrations by laboratory scientists skilled in manual cell counting showed less variation than the portable imaging and taxa classification system 100 as opposed to Coulter Counter data using laboratory cultures, as shown in FIG. 7. The portable imaging and taxa classification system 100 performed better in the field test than in the laboratory test. There was a negligible positive bias of 3%, and the total error (MAPE) was only 22% over the range from 100,000 to 2,200,000 cells $L^{-1}$. The data were distributed uniformly around the 1:1 line across the range of cell concentrations, although there was a relatively high bias for two of the low cell counts. This bias does include both the error in the manual cell counts and portable imaging and taxa classification system 100 cell counts. Consider also that manual cell counts have a typical uncertainty of about 10-20%.

Figure 8:
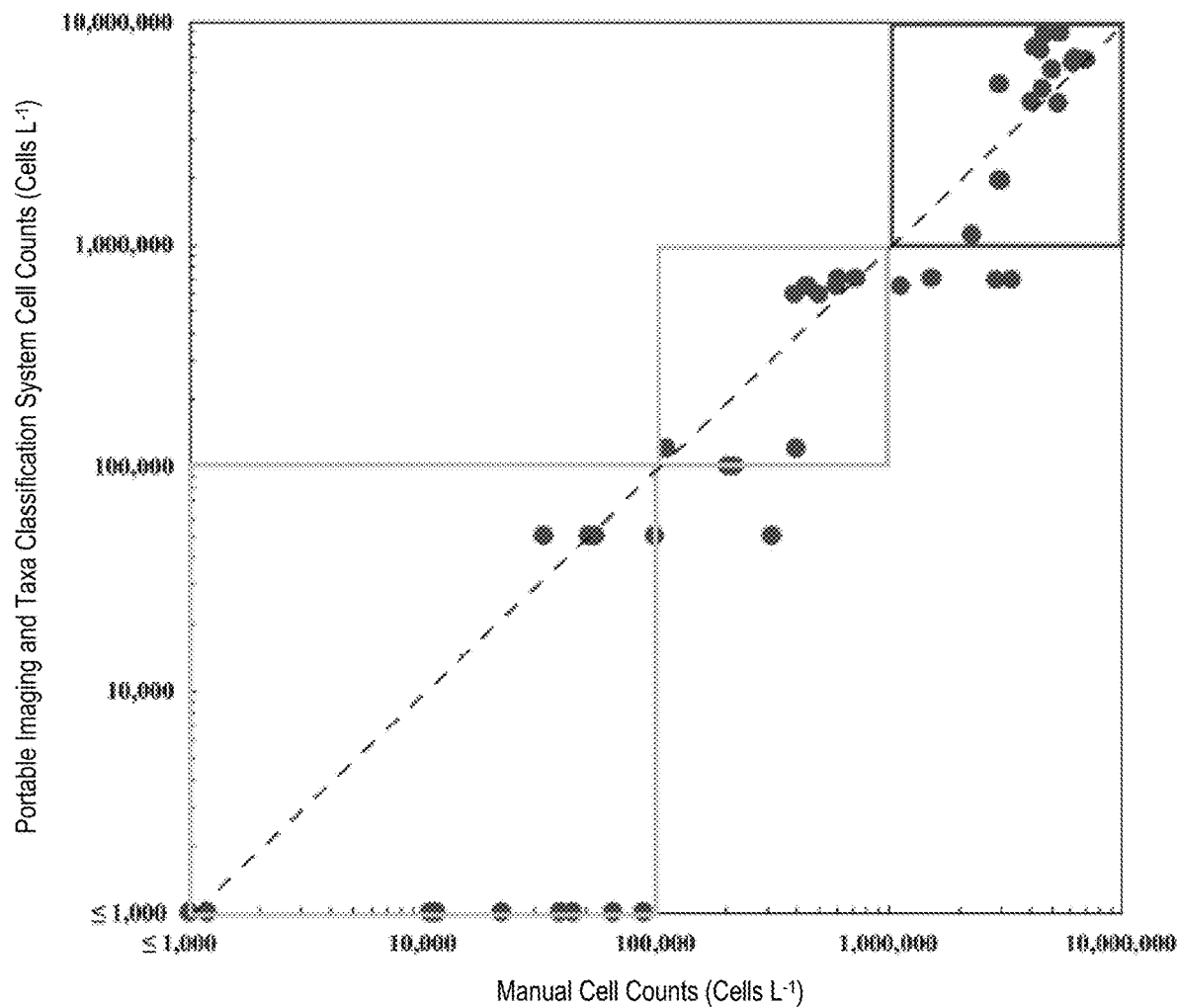
FIG. 8 is a chart showing a correlation between estimates of field samples of the portable imaging and taxa classification system and cell counts of corresponding samples made by the inventors are shown according to various embodiments of the present disclosure.

The field samples collected by trained citizen scientists had a greater error than the initial deployment by the inventors. Excluding the results where no cells were reported by either manual counts or the portable imaging and taxa classification system 100, the MAPE=52%, primarily driven by a negative bias of 22%, shown in FIG. 8. For a measure of respiratory risk, it is critical that the portable imaging and taxa classification system 100 correctly identify *K. brevis* abundances with low, medium, or high-risk. The classification matrix showed limited confusion between categories with an overall accuracy of 91%, as shown in Table 1 below.

TABLE 1

Portable Imaging and Taxa Classification System Classification Matrix

| Microscope Counts | Low-Risk | Medium-Risk | High-Risk | Producer Accuracy |
|---|---|---|---|---|
| Low | 46 | 0 | 0 | 100% |
| Medium | 1 | 11 | 0 | 91% |
| High | 0 | 4 | 15 | 79% |
| User Accuracy (Reliability) | 98% | 73% | 100% | 94% |

Significantly, there was no confusion between high and low cell abundances. High concentrations were underestimated at a medium level 21% of the time. Of the forty-six samples falling into low-risk range based on cell counts, all fell in the same low-risk category based on portable imaging and taxa classification system 100 estimate. One of the twelve samples identified as falling in the medium-risk category by manual counts was assigned a low-risk estimate by portable imaging and taxa classification system 100, while two others were assigned medium-risk at the minimum category limit of 100,000 cells $L^{-1}$. Four of the nineteen samples falling into the high-risk category were assigned a medium-risk estimate by the Portable imaging and taxa classification system 100. The remaining fifteen samples fell in the high-risk category as expected. The overall classification accuracy was 94%, with Kappa=0.89, indicating extremely good agreement.

Figure 9:
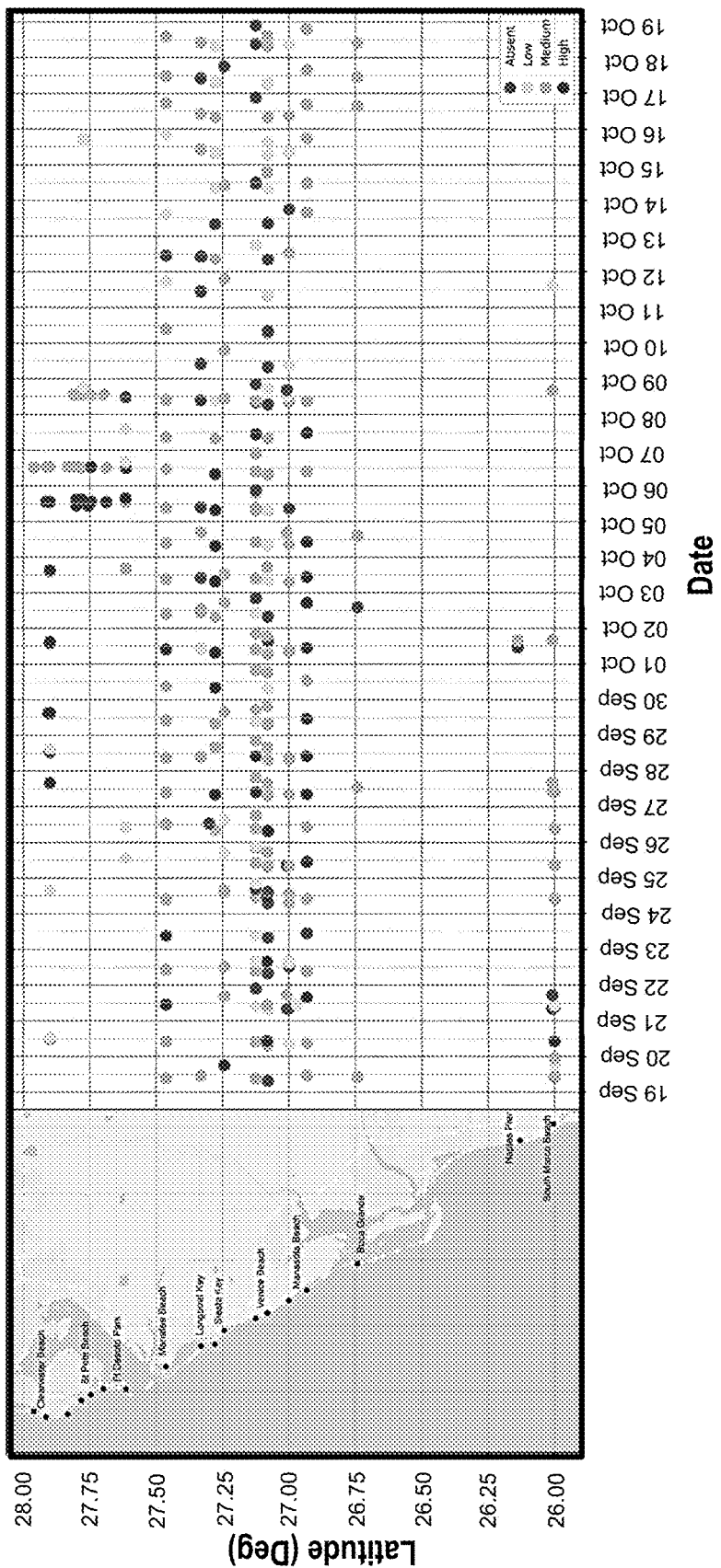
FIG. 9 is a chart showing results of volunteer monitoring on the west coast of Florida over a thirty day period using the portable imaging and taxa classification system according to various embodiments of the present disclosure.

The ease of use of the portable imaging and taxa classification system 100 and dedication of the citizen scientists involved in this study were demonstrated over many weeks, shown in FIG. 9. Some beaches were sampled nearly daily, although an interval of four to six days was more typical. At one beach in the study, Venice Beach, there were two volunteers, and they frequently coordinated their sampling to collect both frequencies for most of the state and county programs, which collected one sample per week. Laboratory studies using pure cultures, and an initial field trial by scientists, confirmed that the portable imaging and taxa classification system 100 accurately estimates *K. brevis* abundance at concentrations ranging from at least 50,000 to 10,000,000 cells $L^{-1}$.

Additionally, the portable imaging and taxa classification system 100 is not limited to only detecting *K. brevis* and can detect a variety of particles in a variety of water locations, such as those shown in Table 2 (below).

TABLE 2

| Particle | Location |
|---|---|
| Karenia brevis | Ocean |
| Pyrodinium bahamense | Ocean |
| Alexandrium species | Ocean |
| Diatoms | Ocean and Lakes |

TABLE 2-continued

| Particle | Location |
|---|---|
| Zika (mosquito) larvae | Freshwater |
| Microplastics | Everywhere |
| Shellfish larvae | Salt and Freshwater |
| Fish larvae | Salt and Freshwater |
| Zooplankton | Salt and Freshwater |

Figure 10:
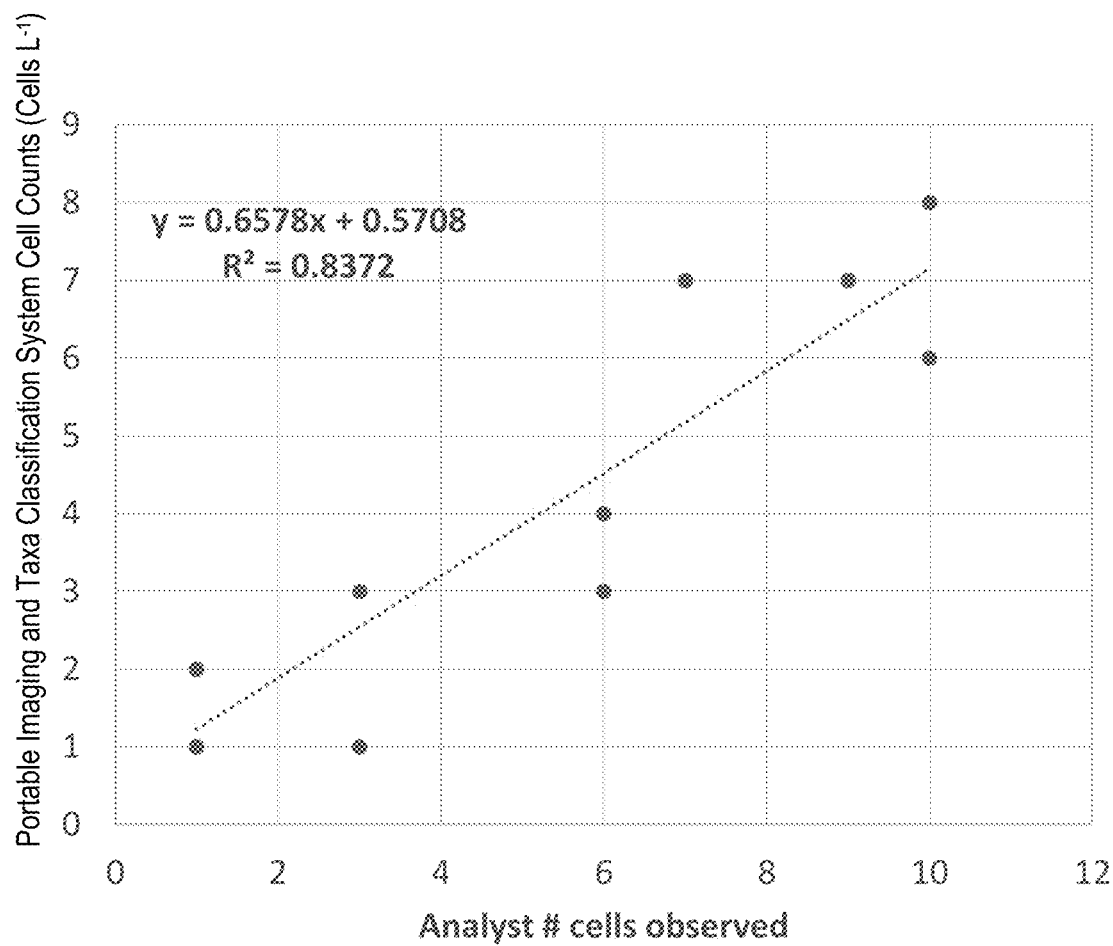
FIG. 10 is a chart showing a correlation between estimates of field samples of the portable imaging and taxa classification system and cell counts of corresponding samples of seawater made by analysists according to various embodiments of the present disclosure.

Correspondingly, FIG. 10 is a chart showing a correlation between estimates of field samples of the portable imaging and taxa classification system and cell counts of corresponding samples made by analysts for seawater spiked at 47,500 to 10.2 million cells/L. Here the R-squared statistical value is computed to be 0.8372 for the estimated data.

Figure 11:
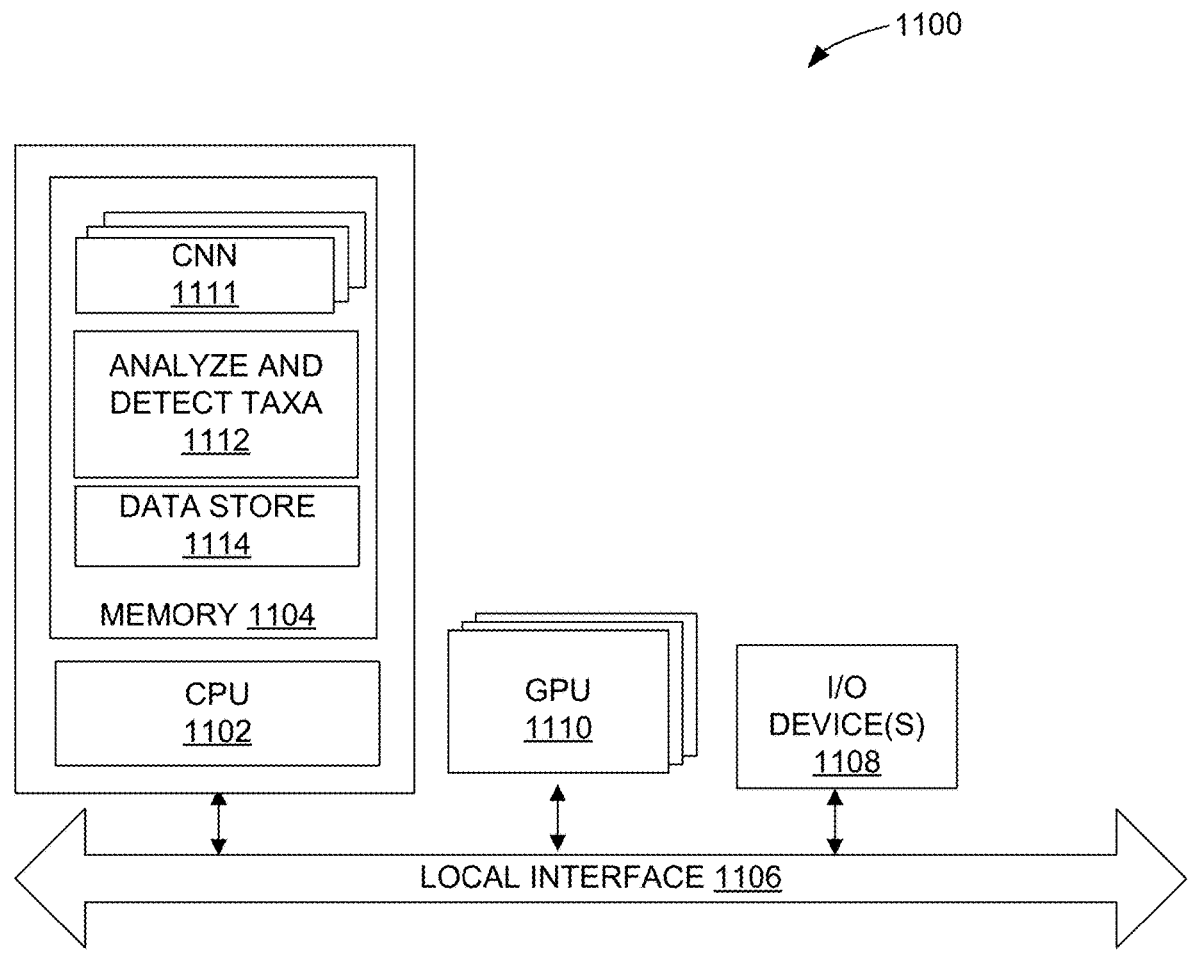
FIG. 11 depicts a schematic block diagram of a computing device that can be used to implement various embodiments of the present disclosure.

Next, FIG. 11 depicts a schematic block diagram of a computing device 1100 that can be used to implement various embodiments of the present disclosure. An exemplary computing device 1100 includes at least one processor circuit, for example, having a processor 1102 (CPU) and a memory 1104, both of which are coupled to a local interface 1106, and one or more input and output (I/O) devices 1108. The local interface 1106 may comprise, for example, a data bus with an accompanying address/control bus or other bus structure as can be appreciated. The computing device 1100 may further include Graphical Processing Unit(s) (GPU) 1110 that are coupled to the local interface 1106 and may utilize memory 1104 and/or may have its own dedicated memory. The CPU and/or GPU(s) can perform various operations such as image enhancement, graphics rendering, image/video processing, recognition (e.g., object recognition, feature recognition, etc.), image stabilization, machine learning, filtering, image classification, and any of the various operations described herein.

Stored in the memory device 1104 are both data and several components that are executable by the processor 1102. In particular, stored in the memory 1104 and executable by the processor 1102 are code for implementing one or more convolutional neural network (CNN) model(s) 1111 and/or code for analyzing and detecting taxa 1112 in accordance with embodiments of the present disclosure. Also stored in the memory 1104 can be a data store 1114, firmware, and other data. A number of software components are stored in the memory 1104 and executable by a processor 1102. In this respect, the term "executable" means a program file that is in a form that can ultimately be run by the processor. Examples of executable programs can be, for example, a compiled program that can be translated into machine code in a format that can be loaded into a random access portion of one or more of the memory devices 1104 and run by the processor 1102, code that can be expressed in a format such as object code that is capable of being loaded into a random access portion of the one or more memory devices 1104 and executed by the processor 1102, or code that can be interpreted by another executable program to generate instructions in a random access portion of the memory devices 1104 to be executed by the processor 1102. An executable program can be stored in any portion or component of the memory devices 1104 including, for example, RAM, ROM, hard drive, solid-state drive, USB flash drive, memory card, optical disc such as compact disc (CD) or digital versatile disc (DVD), floppy disk, magnetic tape, or other memory components.

Memory 1104 may include both volatile and nonvolatile memory and data storage components. In addition, a processor 1102 can represent multiple processors and/or multiple processor cores, and the one or more memory devices can represent multiple memories that operate in parallel processing circuits, respectively. Memory devices 1104 can also represent a combination of various types of storage devices, such as RAM, mass storage devices, flash memory, or hard disk storage. In such a case, a local interface 1106 can be an appropriate network that facilitates communication between any two of the multiple processors or between any processor and any of the memory devices. The local interface 1106 may include additional systems designed to coordinate this communication, including, for example, performing load balancing. The processor 1102 can be electric or of some other available construction.

Client devices or other computing devices may be used to access user interfaces generated to configure or otherwise interact with a computing environment (e.g., a server or collection of servers). These client devices may include a display upon which a user interface generated by a client application for providing a virtual desktop session (or other session) can be rendered. In some examples, the user interface can be generated using user interface data provided by the computing environment. The client device can also include one or more input/output devices that may include, for example, an imaging device, microscope, a capacitive touchscreen or other type of touch input device, fingerprint reader, or keyboard.

Although the various services and applications described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies may include discrete logic circuits having logic gates for implementing various logic functions upon an application of one or more data signals, application specific integrated circuits (ASICs) having appropriate logic gates, field-programmable gate arrays (FPGAs), or other components.

The flowchart of FIG. 3 shows an example of the functionality and operation of an implementation of portions of components described herein. If embodied in software, each block can represent a module, segment, or portion of code that may include program instructions to implement the specified logical function(s). The program instructions can be embodied in the form of source code that may include human-readable statements written in a programming language or machine code that may include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowchart shows a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic may include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium may include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A portable imaging and taxa classification system, comprising:
   an imaging device coupled to a microscope; wherein at least one computing device is communicatively coupled to the imaging device;
   a memory comprising program instructions stored thereon that are executable by the at least one computing device that, when executed, direct the at least one computing device to:
   access at least one microscopic image captured using an imaging device and a microscope from the memory, wherein the at least one microscopic image has a resolution greater than 640 pixels by 480 pixels, wherein accessing the at least one microscopic image captured using the imaging device and the microscope from the memory comprises:
   accessing a video file captured using the imaging device and the microscope from the memory;
   for each frame of the video file, generating a count of a number of areas of interest in a respective frame of the video file using taxa-specific settings; and
   identifying a single image frame of the at least one microscopic image of the video file having a highest count of the number of the areas of interest;
   execute a machine learning (ML) routine on the at least one computing device using a single image frame of the at least one microscopic image as an input to identify a presence of a taxa, wherein the machine learning routine is selected from a group consisting of: a neural network classifier; a convolutional neural network classifier (CNN); a regions with convolutional neural network features (R-CNN) classifier; and a deep learning classifier; and display information associated with the presence of the taxa in a display device communicatively coupled to the at least one computing device.

2. The system of claim 1, wherein the display of information associated with the presence of the taxa in the display device comprises an annotated image showing the presence of taxa in the single image frame.

3. The system of claim 1, wherein the single image frame of the at least one microscopic image is identified from a video file captured by the imaging device and the microscope without use of a motion detection routine.

4. A system, comprising:
at least one computing device; and
program instructions stored in memory and executable by the at least one computing device that, when executed, direct the at least one computing device to:
access at least one microscopic image captured using an imaging device and a microscope from the memory, wherein the at least one microscopic image has a resolution greater than 640 pixels by 480 pixels, wherein accessing the at least one microscopic image captured using the imaging device and the microscope from the memory comprises:
accessing a video file captured using the imaging device and the microscope from the memory;
for each frame of the video file, generating a count of a number of areas of interest in a respective frame of the video file using taxa-specific settings; and
identifying a single image frame of the at least one microscopic image of the video file having a highest count of the number of the areas of interest; and
execute a machine learning (ML) routine on the at least one computing device using a single image frame of the at least one microscopic image as an input to identify a presence of a taxa.

5. The system of claim 4, wherein the single image frame of the at least one microscopic image is identified from a video file captured by the imaging device and the microscope without use of a motion detection routine.

6. The system of claim 4, wherein the machine learning routine comprises a neural network classifier; a convolutional neural network classifier (CNN); a regions with convolutional neural network features (R-CNN) classifier; and or a deep learning classifier.

7. The system of claim 4, wherein the at least one computing device is a microcontroller, a field-programmable gate array (FGPA), application-specific integrated circuit (ASIC), or a single-board computing (SBC).

8. The system of claim 4, wherein the program instructions direct the at least one computing device to display of information associated with the presence of the taxa in a display device, wherein the display of information comprises an annotated image showing the presence of taxa in the single image frame.

9. The system of claim 4, further comprising an attachment device comprising a housing sized and shaped to secure the imaging device to the microscope, wherein the at least one computing device is disposed within the housing.

10. The system of claim 4, wherein the imaging device is a camera of a mobile telephone, a smartphone, or a tablet computing device.

11. The system of claim 4, wherein the taxa is at least one of: *Karenia brevis Amphidinium* sp. or *Alexandrium catenella*.

12. A computer-implemented method, comprising:
accessing at least one microscopic image captured using an imaging device and a microscope from memory, wherein the at least one microscopic image has a resolution greater than 640 pixels by 480 pixels, wherein accessing the at least one microscopic image captured using the imaging device and the microscope from the memory comprises:
accessing a video file captured using the imaging device and the microscope from the memory;
for each frame of the video file, generating a count of a number of areas of interest in a respective frame of the video file using taxa-specific settings; and
identifying the at least one microscopic image as a single image frame of the video file having a highest count of the number of the areas of interest; and
executing a machine learning (ML) routine on the at least one computing device using a single image frame of the at least one microscopic image as an input to identify a presence of a taxa.

13. The computer-implemented method of claim 12, wherein the single image frame of the at least one microscopic image is identified from a video file captured by the imaging device and the microscope without use of a motion detection routine.

14. The computer-implemented method of claim 12, wherein the machine learning routine is selected from a group consisting of: a neural network classifier; a convolutional neural network classifier (CNN); a regions with convolutional neural network features (R-CNN) classifier; and a deep learning classifier.

15. The computer-implemented method of claim 12, wherein the at least one computing device is a microcontroller, a field-programmable gate array (FGPA), application-specific integrated circuit (ASIC), or a single-board computing (SBC).

16. The computer-implemented method of claim 12, further comprising providing the imaging device and the microscope.

17. The computer-implemented method of claim 16, further comprising providing an attachment device comprising a housing sized and shaped to secure the imaging device to the microscope, wherein the at least one computing device is disposed within the housing.

18. The computer-implemented method of claim 16, wherein the imaging device is a camera of a mobile telephone, a smartphone, or a tablet computing device.

19. The computer-implemented method of claim 12, wherein the taxa is at least one of: *Karenia brevis Amphidinium* sp. or *Alexandrium catenella*.

20. The computer-implemented method of claim 12, further comprising displaying information associated with the presence of the taxa in a display device communicatively coupled to the at least one computing device, wherein the display of information associated with the presence of the taxa in the display device comprises an annotated image showing the presence of taxa in the single image frame.

\* \* \* \* \*